United States Patent [19]

Sanzero et al.

[11] Patent Number: 4,752,527
[45] Date of Patent: Jun. 21, 1988

[54] CHEMICALLY TREATED GLASS FIBERS FOR REINFORCING POLYMERIC MATERIALS PROCESSES

[75] Inventors: George V. Sanzero, New Kensington; Howard J. Hudson, Whitaker; David T. Melle, Pittsburgh, all of Pa.

[73] Assignee: PPG Industries, Inc., Pittsburgh, Pa.

[21] Appl. No.: 925,463

[22] Filed: Oct. 30, 1986

Related U.S. Application Data

[63] Continuation of Ser. No. 748,389, Jun. 25, 1985, abandoned, which is a continuation-in-part of Ser. No. 683,740, Dec. 19, 1984, abandoned.

[51] Int. Cl.$^4$ ............................................. D02G 3/00
[52] U.S. Cl. ............................ 428/391; 428/375; 428/378; 428/392; 65/3.41; 65/3.43; 65/3.44
[58] Field of Search ............... 428/375, 391, 392, 378; 65/3.41, 3.43, 3.44

[56] References Cited

U.S. PATENT DOCUMENTS

| | | | |
|---|---|---|---|
| 3,473,950 | 10/1969 | Wong | 428/391 |
| 3,923,708 | 12/1975 | Furukawa et al. | |
| 3,969,299 | 7/1976 | Burns et al. | |
| 4,110,094 | 8/1978 | Motsinger | 427/401 |
| 4,219,457 | 8/1980 | Taniguchi et al. | 523/205 |
| 4,295,871 | 10/1981 | Droux et al. | |
| 4,330,444 | 5/1982 | Pollman | |
| 4,347,278 | 8/1982 | Flautt et al. | |
| 4,436,848 | 3/1984 | Haines et al. | |
| 4,448,910 | 5/1984 | Haines et al. | 523/402 |
| 4,448,911 | 5/1984 | Haines et al. | 523/411 |
| 4,457,785 | 7/1984 | Hsu et al. | |
| 4,461,804 | 7/1984 | Motsinger | 428/391 |
| 4,518,653 | 5/1985 | McWilliams et al. | |

FOREIGN PATENT DOCUMENTS

| | | |
|---|---|---|
| 850726 | 9/1970 | Canada. |
| 55-126552 | 6/1980 | Japan. |
| 2077275 | 12/1981 | United Kingdom. |

OTHER PUBLICATIONS

Neoxil LC 98710 Technical Leaflet from Savid Chemical Company, pp. 37–40.
Technical Leaflet from Savid Chemical Co., Como, Italy, pp. 14–22.

Primary Examiner—Sharon A. Gibson
Attorney, Agent, or Firm—Kenneth J. Stachel

[57] ABSTRACT

Chemically treated glass fibers having good processability are useful in producing fiber reinforced polymeric matrices, wherein the glass fibers have good wettability and are not detrimental to the weatherability of the fiber reinforced polymeric matrices. The chemically treated fibers have the dried residue of an aqueous chemical treating composition having at least a bisphenol A polyester film forming polymer compatible with and soluble in the matrix polymer, acryloxy-containing or methacryloxy-containing organo coupling agent in an effective coupling agent amount, cationic fiberous lubricant in an effective lubricating amount, with an antistatic agent that is a cationic organic quaternary ammonium salt having alkoxy moieties, and water in an amount to give a total solids for the aqueous chemical treating composition in the range of about 1 to about 30 weight percent. The aqueous chemical treating composition is essentially free of inorganic antistatic agents. In addition, the aqueous chemical treating composition can have one or more strand hardening agents such as melamine formaldehyde resin. The amount of the organic quatenary ammonium antistatic agent generally is in the range of from 0.05 to around 0.4 weight percent of the aqueous chemical treating composition. The chemically treated glass fibers can be produced in any form such as chopped strand or continuous strand for combination with polymeric matrices including both filled and unfilled systems for producing reinforced polymeric matrices such as glass fiber reinforced polymeric panels which can be clear, translucent or pigmented.

18 Claims, 3 Drawing Sheets

CHEMICALLY TREATED GLASS FIBERS FOR REINFORCING POLYMERIC MATERIALS PROCESSES

This application is a continuation of application Ser. No. 748,389, filed June 25, 1985, which was a continuation-in-part of U.S. Ser. No. 683,740, filed Dec. 19, 1984, both now abandoned.

The present invention is directed to glass fibers treated with an aqueous chemical treating composition, where the fibers are ideal for use in reinforcing polymeric matrices for producing panels and particularly, translucent panels.

The reinforced plastic industry has been using glass fibers in various forms for reinforcing polymeric matrices to produce myriad products. For instance, glass fibers have been used in the forms of continuous and chopped filaments and strands and mats and rovings and woven and nowoven fabrics to reinforce polymers. Both thermoplastic and thermosetting polymeric matrices have been reinforced with the various forms of glass fibers in producing such products as sheet molding compound, bulk molding compound, injection molding products, spray up molding products and the like molding products.

In producing glass fibers for the polymeric reinforcement market, the glass fibers are attenuated from molten streams of fiberizable glass material from a bushing or a like device connected to a furnace containing molten fiberizable glass material. The glass fibers are attenuated by a winder, which collects gathered filaments into a package, or by rollers, which pull the fibers before they are collected and chopped. In the process of producing glass fibers, a chemical treating composition is applied to them shortly after they are attenuated as the molten streams of glass. The chemical treating composition is usually an aqueous composition, traditionally containing film forming materials, coupling agents and lubricants. The chemical treating composition is needed to retard inter filament abrasion of the glass fibers, when they are gathered into a bundle of glass fibers or strands and to make the glass fibers compatible with polymeric matrices that they are to reinforce. Typically, the chemically treated glass fibers are dried either in the package form or in the chopped strand form before they are used for reinforcing polymeric matrices.

Glass fiber reinforced polymeric matrices like clear or translucent reinforced plastic panels have applications in solar collectors, sky lights, artificial light fixture covers, patio covers, highway signs and markings, green house glazings and the like. In translucent panels with glass fiber reinforcement, the glass fibers must have particular characteristics over and above the usual glass fiber characteristics required in other reinforced polymeric products. For instance, the glass fibers must not reduce the clarity or weatherability of the panels, and the glass fibers must have adequate processability in the production of the panels. Adequate processability includes good strand choppability and a reduction of any tendency for strand to strand adhesion in producing the panels and ready dispersibility of the strands in the polymeric matrix in the allotted processing time. A stubborn, perplexing problem confronting the art in this area is that with particular types of glass fibers and with particular components of the aqueous chemical treating composition, the requisite characteristics are difficult to achieve. In some instances, the difficulty actually amounts to several of the characteristics being mutually exclusive.

It is an object of the present invention to provide chemically treated glass fibers that are processable into glass fiber reinforced plastics and especially, clear or translucent glass fiber reinforced plastic panels.

SUMMARY OF THE INVENTION

Glass fibers of the present invention having the dried residue of an aqueous chemical treating composition present on a substantial portion of the surface of the fibers have good processability for reinforcing polymeric matrices, and result in cured matrices having good weatherability.

The aqueous treating composition has four principal nonaqueous components. One nonaqueous component is one or more aqueous soluble, dispersible or emulsifiable bisphenol A type polyester film forming polymer alone or in a blend with an epoxy-containing film forming polymer compatible with and soluble in the matrix polymer. Another nonaqueous component is one or more acryloxy- or methacryloxy-containing organo coupling agents. An additional nonaqueous component is one or more cationic filament lubricants, for instance, polyalkylene imines partially amidated with fatty acids at least one of which is pelargonic acid. Another nonaqueous component is one or more antistatic agents that are cationic organic quaternary ammonium salts having one or more alkoxy moieties in an effective antistatic amount. The composition is essentially free of inorganic antistatic agents and hydrogenated vegetable oil. The amount of water in the composition allows the glass fibers to be treated with the aqueous treating composition. In addition, the aqueous composition can have a strand hardening agent. The predominent amount of the nonaqueous components is comprised of the film forming polymer, while the organo coupling agent and lubricant are present in effective amounts for coupling and lubricating, respectively. The effective antistatic amount of antistat is in the range of about 0.05 to about 0.4 weight percent of the aqueous treating composition.

In a broad aspect of the invention, the aqueous treating composition is applied to glass fibers, produced from any fiberizable glass composition, and the fibers are produced into chopped strands or multilayered packages of continuous strands. In a preferred aspect of the invention, the fiberizable glass composition may be composed of materials to result in glass fibers having a low refraction index in the range of 1.5495–1.5740. These sized glass fibers can reinforce proper polymeric matrices to produce translucent, and if desired, clear glass fiber reinforced polymeric panels. The translucent glass fiber reinforced polymeric panels have glass fibers that are not plainly apparent and do not detract from weatherability.

DETAILED DESCRIPTION OF THE INVENTION AND PREFERRED EMBODIMENT

Figure 1:
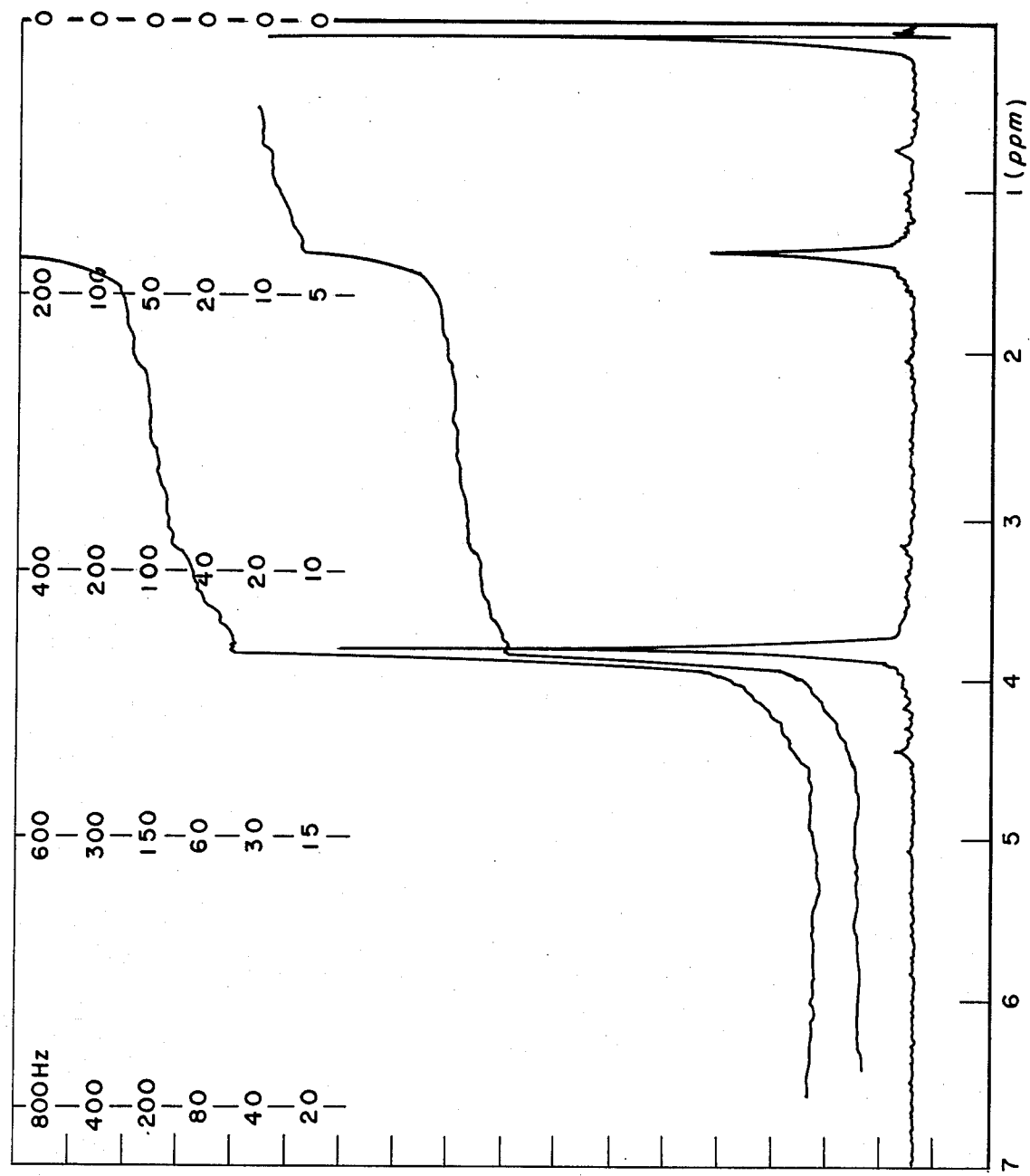
FIG. 1 is an nuclear magnetic resonance curve for the antistatic agent that is a cationic organic quaternary ammonium salt having at least one alkoxy moiety that is commercially available under the trade designation Neoxil ® AO-5620.

In the production of glass fiber reinforced polymeric materials, the glass fibers must have particular characteristics. In addition, when the reinforced polymeric material is produced into clear or translucent polymeric panels, such as those used in skylights, patio covers, highway signs and markings, artificial light fixture covers and decorative facades, solar collectors, green house glazings, and the like, the glass fibers must have additional characteristics. The characteristics that are necessary for the glass fibers to be used in such a matrix polymer for producing such products include good choppability for dispersibility in the matrix polymer, good solubility in the matrix polymer for fast wet-out, low fiber prominence and good clarity in the cured polymer panel and good weatherability in the cured polymer panel. For the choppability of the glass fibers in the form of bundles of glass fibers or strands of gathered glass fibers, the resulting bundles and/or strands should not have strand to strand adhesion, commonly referred to in the industry as matchsticking. Such a characteristic of the glass fiber bundles or strands would result in poor wet-out of the glass fibers in the polymeric matrix. The glass fibers of the present invention are most suitable for use in forming clear and translucent panels of glass fiber reinforced polymeric materials such as unsaturated polyesters and epoxies.

In addition, the chemically treated glass fibers of the present invention can also be used in any polymeric matrix including filled and pigmented systems, where there is a desirability to have the fast wet-out of the glass fibers in the polymeric matrix. "Wet-out" means that the matrix polymer encapsulates the glass fibers and very little, if any, bare glass is visible throughout the cured fiber reinforced polymeric material. Wet-out during production of the glass fiber reinforced polymeric material is a measure of the apparent intimacy of contact between the polymeric matrix and the glass fibers. If the glass fibers are not intimately wet-out following the application of the glass fibers to the polymeric matrix, this may affect adversely the processability, curing characteristics and surface properties of the final cured fiber reinforced polymeric material. In processing of panels of fiber reinforced polymeric material, the wet-out of the chopped glass fiber strand or bundles of fibers must occur within a short time before the polymeric matrix containing the chopped glass fibers is cured in a processing line. Therefore, the speed of the wet-out of the chopped glass fiber strands or bundles of fibers is an important criteria in producing such products as clear or translucent panels. Any retardation of the speed of wet-out of the chopped glass fiber strands would not be advantageous in the processing of panels of fiber reinforced polymeric materials. Also the chemically treated fibers of the present invention are best suited in producing weatherable, fiber reinforced polymeric panels.

A commercially available chemically treated glass fiber strand product made in accordance with U.S. Pat. No. 4,110,094 assigned to the same assignee as this patent application, was used to produce panels of glass fiber reinforced acrylic polyesters. It was discovered that the panel product had good weatherability, but the panel product was deficient in clarity and wet-out of the glass fiber strand and in matchsticking between the glass fiber strands. The chemically treated glass fiber strands had a dried residue of an aqueous treating composition having a 4,4' isopropylidene diphenol bisphenol-A-type epoxy resin, a reaction product of a partial ester of maleic anhydride and an epoxy resin containing one or more unesterified carboxyl groups and containing more than one epoxy, a propylene glycol-ethylene oxide surfactant, (F-108 surfactant), hydrogenated corn oil (Pureco ® oil), polyethylene glycol emulsifier (Triton ® X-100), octylphenoxypolyethylene oxyethanol, polyvinyl pyrrolidone film former, methacryloxypropyltrimethoxy silane, acetic acid, fatty acid amine salt as a glass fiber lubricant (Emery 6717) and sufficient water to give a solids content in the range of about 6.5±0.2 percent.

It was surmised that the treating composition for the glass fibers affected the ultimate properties of the fiber reinforced polymeric panel by the interaction of the chemical treatment on the glass fibers and the chemistry of the polymeric matrix. After numerous experiments, it was discovered that many of the ingredients provided both beneficial and detrimental effects with the latter effects sometimes overshadowing the former effects. For instance, the methacryloxypropyltrimethoxy silane or its hydrolysis products provide good weatherability for the reinforced polymer panels. Unfortunately, this silane is a major contributor to the generation of static in the chemically treated glass fibers. These two effects are so pronounced that weatherability cannot be achieved without the concomitant static generation with the fibers and strands. It was further discovered that several other components in sizing formulations reduced wettability of the strand, increased tackiness of the strand, reduced strand choppability and reduced clarity of the fiber reinforced panels.

It has been discovered that the factors and functions associated with producing chemically treated glass fibers, which have good wettability in the production of glass fiber reinforced polymeric matrices, and which have good choppability and a reduced tendency for matchsticking, and associated with producing panels of glass fiber reinforced polymeric matrices having not only good weatherability but also good clarity can be interrelated so as not to be detrimental to each other. Also, the absence of particular materials from the dried residue of the glass fibers of the present invention are necessary to achieve the desired characteristics.

The film forming polymer present in the aqueous treating composition, which results in the treated glass fibers of the present invention, is both compatible with and soluble in the polymeric matrix. The polymeric matrix is that polymer which the glass fibers reinforce. The compatibility and solubility are such that the treated glass fibers wet-out in the matrix polymer in less than around 10 minutes, when the fibers and matrix polymer are intimately contacted. The aqueous soluble, dispersible or emulsifiable film forming polymer of the aqueous chemical treating composition is a polymer that forms a clear, translucent film with limited tack upon evaporation of water and any solvents or upon curing. The limited-tack film forming polymer contributes its characteristics of limited tacticity to the dried residue of the aqueous treating composition. The film of the dried residue of the aqueous treating composition has a less tacky characteristic than a film of any epoxy polymer like Epon 828 resin. Also, the film is tough and gives a nearly continuous film on the surface of the glass fibers. In achieving such a film characteristic, there is no penalty of reducing, to any great extent, the wettability of the treated glass fibers, or in detrimentally affecting the clarity of polymeric panels reinforced with the treated glass fibers.

The nature of the film formed by the aqueous chemical treating composition with the limited tack type film forming polymer is that glass fibers, when chopped into quarter inch lengths, have an apparent bulk density of greater than about 30 pounds/ft$^3$. The apparent bulk density test is conducted by any method known to those skilled in the art. A nonexclusive example of the apparent bulk density test includes pouring measured weight of chopped strands into a 250 milliliter graduated cylinder. The cylinder is mounted into a bulk density tester like that available as J-M Bulk Density Tester from Richmond's Machine Company, East Main Street, Montpelier, Ohio, 43543. The counter of the tester is set for 50 taps and the machine is started. After the machine stops, the volume of glass fibers in the graduated cylinder is read. The apparent bulk density is then calculated by dividing the weight of the chopped strand by the volume reading after tapping. This figure is multiplied by 62.43 to obtain the apparent bulk density in pounds per cubic foot.

Figure 2:
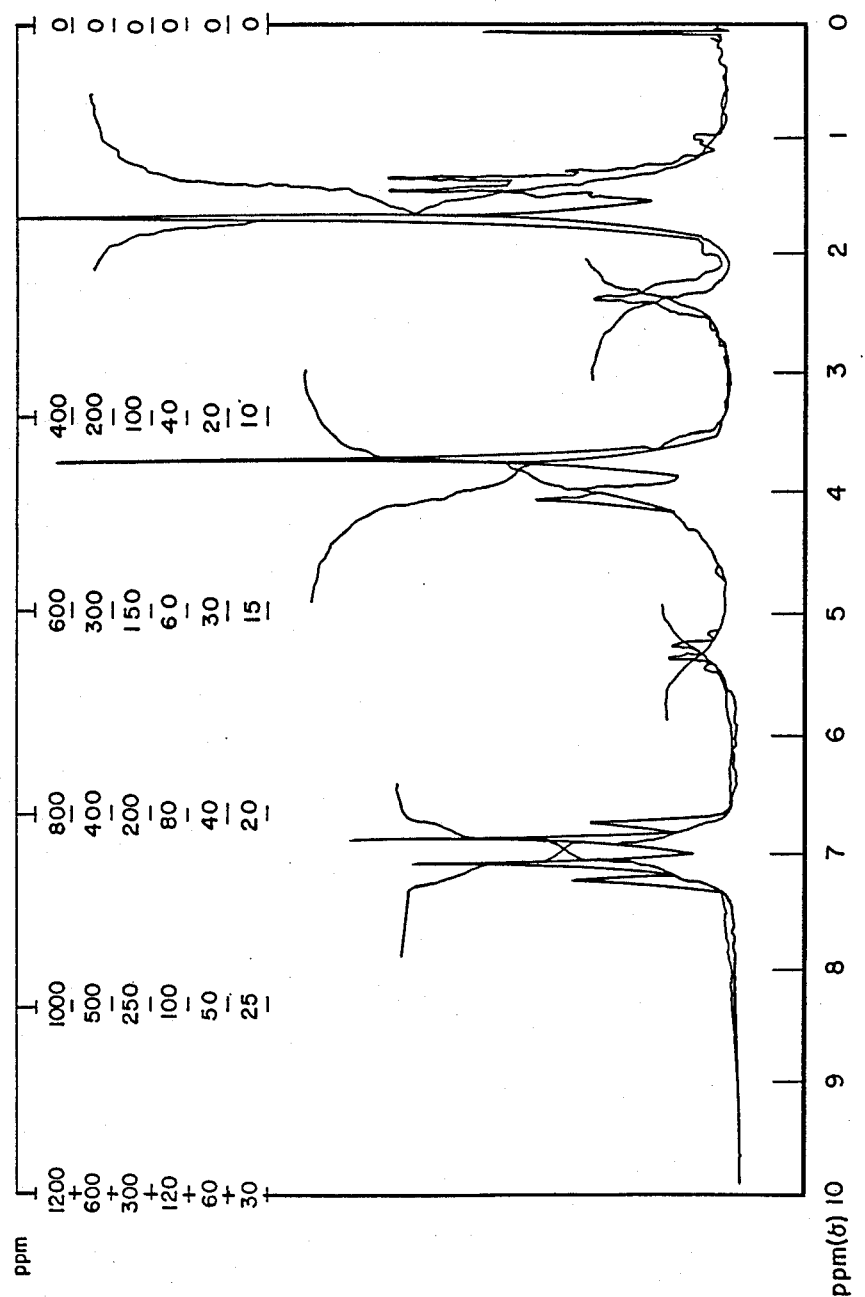
FIG. 2 is a nuclear magnetic resonance curve for an aqueous emulsion of a bisphenolic polyester resin which is commercially available under the trade designation Neoxil ® 954 material from Savid.

A nonexclusive example of a suitable film forming polymer with limited tack is an aqueous soluble, dispersible or emulsifiable bisphenolic polyester polymer like one formed from bisphenol A, butene diol or maleic anhydride or maleic acid and adipic acid with internal and/or external emulsification through the use of a polyalkylene polyol such as polyethylene glycol. Preferably, the polyester is internally emulsified through ethoxylation for a polymer with a weight average molecular weight in the range of about 30,000 to about 45,000 and a polydispersity index Mw/Mn around 1.12 and an Mz/Mv of around 1.08. Preferably, this type of bisphenol polyester limited tack polymer is the sole film forming polymer in the aqueous chemical treating composition. An example of such a polymer is the single aqueous emulsion of alkoxylated bisphenol polyester resin commercially available under the trade designation Neoxil® 954 and manufactured by Savid, Como, Italy. The properties of the Neoxil® 954 resin are as follows: appearance—milky liquid, solids content—46±3%, pH—3-5, viscosity at 23° C.—2000±500 cps. An NMR curve for the Neoxil® 954 resin emulsion is shown in FIG. 2. The NMR was performed on a Varian EM-360 60 MHz proton NMR Spectrometer with a sweep time of 5 minutes and sweep width of 10 ppm and an end of sweep of 0 ppm and a zero reference of tetramethylsilane (TMS) and an ambient sample temperature and with DCCL$_3$ solvent. The amount of the film forming polymer in the aqueous treating composition is in the range of about 1 to about 20 weight percent of the solids of the aqueous treating composition.

When more than one film forming polymer is used, an epoxy-containing polymer or copolymer can be used along with a nontacky polymer. Separate aqueous emulsions of the epoxy-containing polymer and the nontacky film forming polymer can be combined into a single emulsion or one single aqueous emulsion can be prepared wherein the epoxy-containing polymer and limited tack film forming polymer are solubilized, dispersed or emulsified in the aqueous emulsion. In preparing a single emulsion having the blended epoxy-containing polymer and nontacky film forming polymer, any nonionic, cationic, anionic or amphoteric emulsifying agents can be used. It is preferred to use nonionic emulsifying agents having an HLB in the range to match the ionic character of the blended polymers. Nonexclusive examples include: epoxy-containing polymers or copolymers which have an epoxy equivalent weight in the range of about 180 to about 230 grams of polymer for 1 gram equivalent of epoxide. The epoxy-containing polymer or copolymer assists in yielding treated glass fibers with good wettability for fast wet-out of the glass fibers in polymeric matrices such as saturated and unsaturated polyesters and epoxies. Epoxy polymers with epoxy equivalent weights greater than about 230 grams of polymer for one gram equivalent of epoxide will produce a glass fiber reinforced polymeric panel that is hazy. If the epoxy equivalent weight is less than about 180 grams, the treated glass fibers are too sticky. The epoxy equivalent weight or epoxide equivalent which is defined as the weight of resin in grams which contains one gram equivalent of epoxy can be determined by any method known to those skilled in the art. Nonexclusive examples include infrared spectroscopy and wet analysis such as the titration method with sodium hydroxide after the addition of pyridinium chloride in pyridine to the epoxy polymer. When the epoxy resin is used its amount in the aqueous treating composition can vary from a minor to a major portion of the solids of the aqueous treating composition. The epoxy resins that can be used can be epoxy resins prepared from bisphenol A and a comonomer such as epihalohydrin to form the diglycidyl ether of bisphenol A. Epoxy resins obtained by the use of hydroxyl compounds such as 4-isopropylidene bis(2,6-dibromophenol), dihydroxybenzenes, 1,1,2,2-tetra(p-hydroxy phenyl) ethane, 1,4-butane diol, glycerol, polyoxyalkylene (glycol), linoleic dimer acids, 1,1,3-tris(p-hydroxyphenyl)-propane and the like in reaction with epihalohydrin can also be used. Also, epoxy resins produced from aliphatic glycidyl ethers can be used. Also, epoxy resins produced by the reaction of monoepoxy compounds with themselves or other epoxy generating compounds can be used, for example, unsaturated monoepoxy compounds may be homopolymerized through the unsaturation to produce polyepoxy polymer like poly(allyl glycidyl ether). Particularly, suitable epoxy resins are the phenolic epoxies which are obtained by the reaction of a stoichiometric excess of an epihalohydrin such as epichlorohydrin with a polyhydric phenol such as bis(4-hydroxyphenol)-2,2propane, bis(hydroxyphenyl) methane which is obtained by the acid condensation of two moles of phenol with one mole of formaldehyde, hydroquinone, resorcinol or with polyhydroxy alcohol such as polyalkylene glycols, sorbitol, glycerol and the like. By varying these portions of the epihalohydrin, polyhydroxy compound and/or by varying the reaction conditions, compounds of low, intermediate or higher molecular weights may be produced which range from liquids to solids. Useful commercially available epoxy resins include that available from Shell Chemical Corporation under the trade designation Epon® 828 epoxy resin, and the epoxies available from Ciba-Geigy under the trade designation Araldite® resins, and from Dow Chemical Company under the trade designations D.E.R. or D.E.N. resins, and the Epi-Rez® resins available from Celanese Polymer Specialties Company. A suitable epoxy-containing copolymer which can be used is the epoxidized polyvinyl acetate copolymer available from National Starch under the trade designation 1971 resin.

The aqueous soluble, dispersible or emulsifiable epoxy-containing polymer can have an emulsion or dispersion produced with any suitable surfactant known to those skilled in the art. For example, one or more surfactants which are condensates of ethylene oxide with hydrophobic bases formed by condensation with propylene oxide with propylene glycol can be used. For example, the Pluronic ® F-108 surfactant manufactured by BASF Wyandotte Industrial Chemical Group can be used to form a suitable emulsion or dispersion.

Also when the epoxy-containing polymer or copolymer is used in conjunction with the limited solubility of the tack film forming polymer, the limited tack film forming polymer in the epoxy-containing polymer furthers the compatibility of the two polymers or polymeric emulsions. This compatibility assists in achieving a reduction in the tackiness of the film of the dried residue of the aqueous treating composition on the glass fibers over that of glass fibers having a dried residue of just epoxy-containing polymer. The reduction in tackiness translates into a reduction in matchsticking of the chopped treated glass fibers due to strand to strand adhesion.

In addition to the aqueous soluble, dispersible or emulsifiable film forming polymer, the aqueous treating composition also has present one or more acryloxy-containing or methacryloxy-containing organo-functional coupling agents. The coupling agents can be organo-functional silane coupling agents or organo-functional Werner compounds and the like having on the organofunctioning portion of the molecule the following moiety:

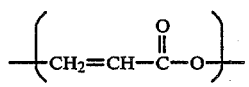

as well as methacryloxy and substituted acryloxy residues such as:

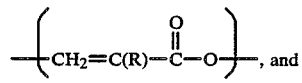, and

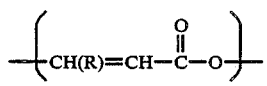

where R is a lower alkyl group having up to 4 carbon atoms. A nonexclusive example of such a coupling agent is methacryloxy alkyl trialkoxy silane. The alkoxy group and the alkyl group have from one to five carbon atoms for the alkyl group. Preferably, the methacryloxyalkyl trialkoxy silane is methacryloxypropyltrimethoxy silane. The methoxy groups of the methacryloxypropyltrimethoxy silane must be hydrolyzed before the silane is incorporated into the aqueous treating composition. This is accomplished by adding an essentially hydrocarbon organic acid such as acetic acid to the coupling agent and stirring for a sufficient time and at a sufficient temperature to hydrolyze one or more of the $SiOCH_3$ groups to form methanol and one or more SiOH groups. Sufficient water is used in the hydrolysis to impart sufficient activity to the acetic acid. The amount of silane coupling agent used in the aqueous treating composition is an effective coupling amount in the range of about 0.1 to about 10 weight percent of the solids of the aqueous treating composition, where the larger quantities are ordinarily used at controlled humidity conditions.

In addition to the foregoing components of the aqueous chemical treating composition, there is a glass fiber cationic lubricant in an effective lubricating amount. The lubricants are those which impart lubricity to the glass fibers and gathered bundles of glass fibers and strands and which are water soluble cationic materials. Examples include acid solubilized, fatty acid amides such as stearic amide. The fatty acid amides are both saturated and unsaturated and the acid group contains from 4 to 24 carbon atoms. Also, anhydrous acid solubilized polymers of the lower molecular weight unsaturated fatty acid amides are included. Also included are the alkyl imidazolines, which are formed by reaction of fatty acids with polyalkylene polyamines under conditions to produce ring closure. A particularly suitable cationic lubricant is a polyamino amide material having an amine value of about 200 to 800 that is preferably prepared by using fatty acids at least one of which is pelargonic acid. Also this material can be solubilized further with acetic acid. A nonexclusive example of such a material is the polyalkyleneimine partially amidated with fatty acids like pelargonic acid that is commercially available from Emery Industries, Inc. under the trade designation Emerylube ® 6717. This material is a viscous liquid with a pour point of 55, a density in lbs/gallon of 8.3, a Gardner color of 10, a cloud point of less than 25° C., a flash point of 540° F. (282° C.) and is soluble in water and dispersible in mineral oil. Another suitable material is manufactured under the trade designation Cirrasol ® 185A which is an anhydrous material with a deep reddish amber color which is a viscous liquid at room temperature. It is water dispersible and a one percent solution has a pH of about 8.9 to about 9.4. When the cationic water soluble glass fiber lubricant contains a reactable nitrogen group, the effective amount of the lubricant should be limited to substantially prevent any crosslinking of any epoxy-containing polymer that may be present by the nitrogen-containing groups of the glass fiber lubricant. Generally, the effective amount of the glass fiber cationic lubricant is in the range of about 0.05 to about 0.5 weight percent of the aqueous chemical treating composition.

In addition to having chemically treated glass fibers that have desired characteristics for reinforcing polymeric matrices, the treated glass fibers must be processable into the reinforced product. Reinforced plastic panels are produced with chopped strand reinforcement. The glass fibers are produced initially as continuous fibers and they are subsequently chopped. When the fibers or strands or rovings are chopped from dry continuous material, an abundance of static and chopper cling can ruin the processability of the glass fibers for producing the reinforced panels. To overcome any static and assist in reducing chopper cling, the aqueous chemical treating composition has an antistatic agent that is a cationic organic quaternary ammonium salt having alkoxy moieties. After extensive experimentation into incorporating antistatic agents into the aqueous chemical treating composition, it was discovered that the cationic organic alkoxylated quaternary ammonium salt antistatic agent in the absence of inorganic antistats resulted in good weatherability of fiber reinforced polymeric matrices. Generally, the cationic organic alkoxylated quaternary ammonium salt antistatic agent has a formula such as:

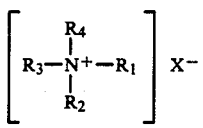

wherein one or more moieties of $R_1$, $R_2$, $R_3$ and $R_4$ can be the same or different alkoxy moieties with or without methylene groups and with a terminal alcoholic group such as:

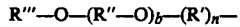

wherein R' is a methylene group ($CH_2$) and n is an integer from 0 to 10 or more; and wherein R" is an ethylene group or propylene group or mixture thereof and b is an integer from 1 to 10 or more; and wherein R''' is hydrogen or a lower alkyl group having one to ten carbon atoms.

When less than four of the groups $R_1$, $R_2$, $R_3$ and $R_4$ are alkoxy groups, the remaining non-alkoxy groups $R_1$, $R_2$, $R_3$ and $R_4$ are alkyl groups having 1 to 30 carbon atoms.

$X^-$ can be any organic or inorganic anions like carboxylates, sulfonates sulfates, phosphates and halide ions. This antistatic agent can be produced by any method known in the chemical art for producing quaternary ammonium salts with alkoxy moieties.

Preferably, the cationic organic alkoxylated quaternary ammonium salt antistat has a formula such as

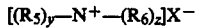

wherein:

$R_5$ is the same alkoxy moiety such as:

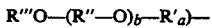

where R' is methylene ($CH_2$) and a is an integer of 1 to 5, and
where R" is ethylene and b is an integer from 2 to 8, and
where R''' is hydrogen or a methyl group, and
wherein y is an integer of 3 or 4, and
wherein when y=3 then Z=1 and when y=4 then Z=0, and
wherein $R_6$ is a long chain alkyl having 6 to 25 carbon atoms, and
wherein $X^-$ is $Cl^-$ or $Br^-$, and
wherein preferably the acid number of the material is at least 10.

Figure 3:
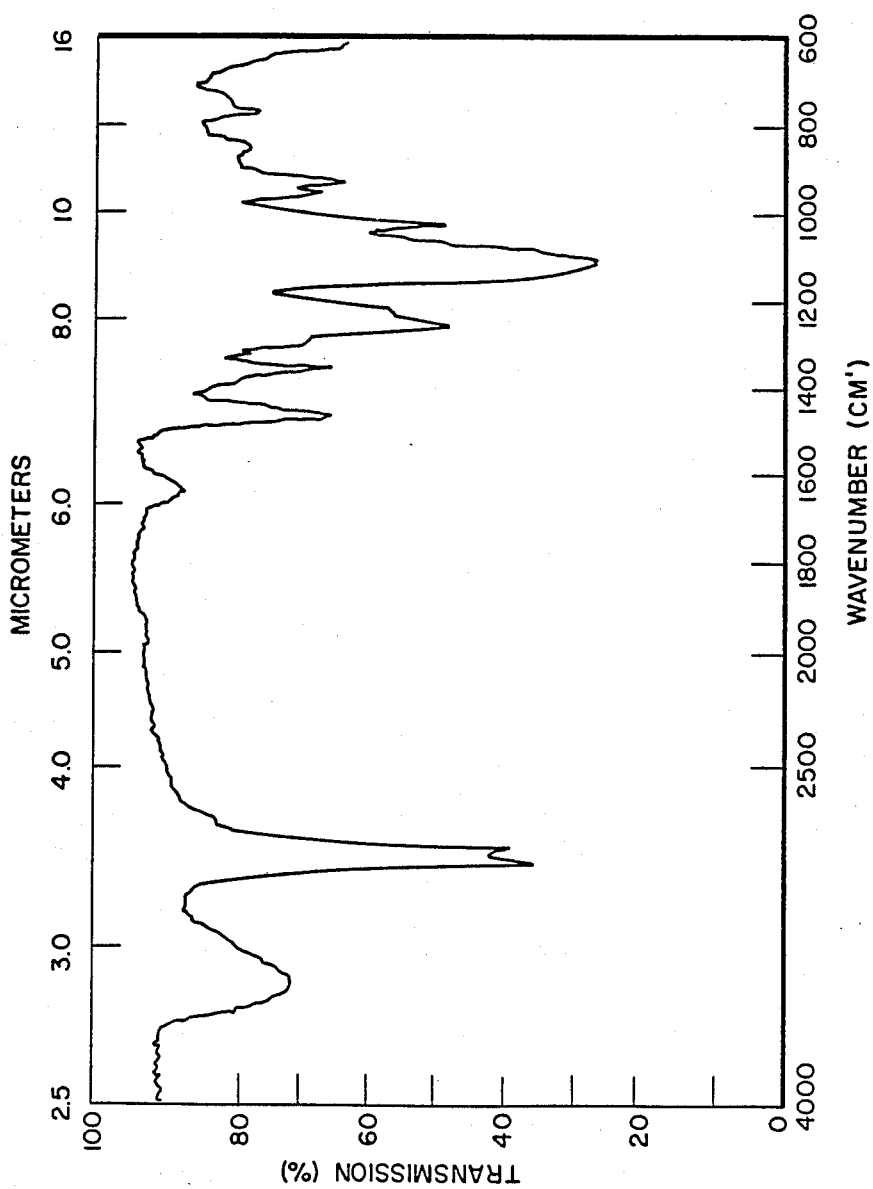
FIG. 3 is an infrared spectrophotometric curve for the antistatic agent that is a cationic organic quaternary ammonium salt having at least one alkoxy moiety that is commercial available under the trade designation Neoxil ® AO-5620.

A nonexclusive example of the cationic organic alkoxylated quaternary ammonium salt antistatic agents include the material commercially available under the trade designation Neoxil ® AO 5620 material available from Savid S.p.A., Como, Italy. This material has the NMR curve of FIG. 1, a molecular weight of 1010 Mn and 1140 Mw, an acid number of 10-20 mgr KOH/p and a pH for 1 percent solution in water of 4-6. The IR of FIG. 3 was obtained from a dried film cast from the Neoxil ® AO 5620 material.

The NMR of FIG. 2 was performed on a Varian E-360 60 MHz proton NMR Spectrometer where the spectrum amplitude was 80, the filter was 0.1 sec., the RF power was 0.05 mg., the sweep time was 5 minutes, the sweep width was 10 ppm with an end of sweep at 0 ppm, and the nucleus was hydrogen, and the zero reference was tetramethylsilane (TMS) and with an ambient sample temperature and with $DCCl_3$ solvent.

The amount of antistatic agent is enough to provide both an antistatic effect and an effect in the reduction in chopper cling without resulting in matchsticking nor in detrimentally affecting weatherability. The amount of the organic quaternary ammonium antistat generally is at least an amount of around 0.05 weight percent of the aqueous treating composition. Too large an amount of the organic quaternary ammonium antistat leads to increased chopper cling and is therefore, detrimental rather than beneficial. Generally, the amount of the organic antistat is in the range of about 0.05 to about 0.4, and preferably around 0.05 to around 0.15 weight percent of the aqueous chemical treating composition for clear translucent panel production. Where filled panels are produced, the amount of the organic antistat can range up to the 0.3 or 0.4 weight percent amount.

The aqueous chemical treating composition is essentially free of any inorganic antistatic agents. Nonexclusive examples of such inorganic antistatic agents are chromic chloride, alkali metal and alkaline earth metal chlorides such as lithium chloride and magnesium chloride which detrimentally affected weatherability.

When the choppability of the chemically treated glass fibers results in low static generation but a detrimental quantity of chopper cling, the aqueous chemical treating composition should also have a strand hardening agent. This material should reduce the cling without adversely causing matchsticking or lowering panel clarity. An effective amount of such a strand hardening agent increases strand integrity to decrease chopper cling. The strand integrity should not be increased to too great an extent, since this may result in increased matchsticking. Nonexclusive examples of a suitable strand hardener are self crosslinkable materials including aldehyde condensate polymers such as melamine formaldehyde, hexakis/methylol-containing condensates, monomers, dimers, trimers and higher oligomers, where for the phenol or resorcinol, compounds include cresol and mixtures of its isomers, xylenol or mixtures of its isomers, a mixture of homologs of phenol and dihydric phenols such as resorcinol, cresorcinol, and meta-xylorcinol can be used. The aldehyde includes any methylene donor that can be used in lieu of formaldehyde, for example, paraformaldehyde, hexamethylenetetramine, acid aldehyde, furfural and mixtures thereof. The aldehyde or methylol condensates can be used in conjunction with acid or basic catalysts. It is preferred to have one or more melamine formaldehyde resins because of their ease in crosslinking and their compatibility with the other polymers in the composition. A particularly suitable melamine formaldehyde resin is the aqueous melamine formaldehyde resin available from Monsanto Company under the trade designation Resimene 841 which has less than two percent free formaldehyde and less than 5 percent methanol and has a boiling point of 210° F. The Resimene 841 also has a vapor pressure of 95 for methanol and 17.5 for water, a vapor density of b 1.11 for methanol and 0.64 for water, a colorless, clear mobile liquid appearance, specific gravity at 77° F. of 1.25 and a percent volatile by volume percent of 29. Another strand hardening agent that may be used is poly(vinyl pyrrolidone). The amount of the strand hardener is any amount equivalent to an amount of melamine formaldehyde resin like Resimene 841 material in the range of at least about 0.1 weight percent of the aqueous treating composition. Larger quantities can be used, but an amount in excess of 0.5 weight percent of the aqueous chemical treating composition does not provide any additional benefits. Preferably, the amount is in the range of around 0.1 to around 0.15 weight percent of the aqueous chemical treating composition. The amount of poly(vinyl pyrrolidone) used should not exceed 0.5 weight percent of the aqueous treating composition, since the poly(vinyl pyrrolidone) may reduce the wet-cut characteristic of treated glass fibers and give the treated glass fibers an undesirable degree of hardness.

Although other additional film forming polymers, coupling agents, lubricants, processing aids and thickeners can be employed in the aqueous chemical treating composition of the present invention, the aqueous chemical treating composition is essentially free of any epoxy curing agents, whose sole function in the aqueous sizing composition would be to crosslink the epoxy-containing polymer or copolymer. In addition, the aqueous chemical treating composition is essentially free of any materials which would not be solubilizable in the limited tack film forming polymer or in the blend of epoxy-containing polymer or copolymer and limited tack film-forming polymer. Such a material is the non-ionic water insoluble hydrocarbon glass fiber lubricants such as hydrogenated hydrocarbon oil. Typically, the water insoluble lubricant is a hydrogenated or saturated fatty acid ester of glycerol and the aqueous chemical treating composition is essentially free of these types of materials.

The aqueous chemical treating composition has a sufficient amount of water to give a total solids for the composition that is sufficient to enable the glass fibers to be treated during their formation with the aqueous chemical treating composition. Generally, the total solids of the aqueous composition is in the range of about 1 to about 30 weight percent and preferably about 3 to about 10 percent. In all events, the amounts of the solid components for an aqueous chemical treating composition should not exceed that amount which will cause the viscosity of the solution to be greater than about 100 centipoise at 20° C. Aqueous solutions having a viscosity of greater than 100 centipoise at 20° C. are very difficult to apply to glass fibers during their formation without breaking the fibers. It is preferred that the viscosity of the size be between 1 and 20 centipoise at 20° C. for best results. Chemical treating compositions with thixotropic gelling or foaming agents can have known viscosities for gels and foams used to treat glass fibers. The pH of the aqueous chemical treating composition is below about 7, and preferably should be in a range of about 4.8 to about 5.2 to maintain the stability of the composition. The aqueous chemical treating composition can be made by combining the components simultaneously or sequentially.

The aqueous chemical treating composition can be applied to any fiberizable glass material such as "E-glass", "621-glass", "621-glass" and low or free boron and/or fluorine derivatives thereof and glass fiber compositions known as "A-glass", "C-glass" and "S-glass". It is preferred when preparing chemically treated glass fibers to be used in the manufacture of clear or translucent polymeric panels that the fiberizable glass composition should result in glass fibers which give a blue hue or cast when they are used to reinforce the acrylic polyester matrix resins. Preferably, the glass fiber compositions give a refractive index for the glass fibers in the range of about 1.5495 to 1.5740. Higher refractive indecies for the glass give an undesirable bronze cast to clear panels reinforced with fibers. Most preferably the refractive index for the glass fibers is in the range of 1.5495 to 1.557.

The aqueous chemical treating composition can be applied to the glass fibers by any method known to those skilled in the art such as during the formation of the glass fibers after the glass fibers have cooled to a sufficient temperature to allow the application of the aqueous chemical treating composition. The aqueous chemical treating composition, typically referred to as a sizing composition, is applied to these glass fibers by applicators having belts, rollers, sprays and the like. The treated glass fibers then can be gathered into one or more strands and collected into a package commonly referred to as a forming package. Also, the glass fibers can be collected into one or more strands and chopped as a wet chopped product. Also, the glass fibers can be gathered into one or more strands and collected as a roving. The glass fibers are dried to reduce their moisture content, and preferably whatever the form of the chemically treated glass fibers, they are dried at temperature and time conditions equivalent to a temperature in the range of about 250° F. (121° C.) to less than 300° F. (149° C). for 11 hours. The drying can be accomplished in any conventional glass fiber drying oven such as forced air ovens, dielectric ovens, and the like. The dried glass fibers have a dried residue of the aqueous chemical treating composition present on the surfaces of the glass fibers making up the strands. Preferably, the amount of the dried residue on the glass fibers is in the range of about 0.5 to about 1.2 weight percent LOI (loss on ignition).

The dried glass fibers having the residue of the aqueous chemical treating composition can be used in any process for producing polymeric reinforced polymers such as saturated and unsaturated polyesters and epoxies. One process in which the glass fibers are particularly suitable is the formation of clear or translucent acrylic polymer glass fiber reinforced panels. With the high speed commercial operations used in producing glass fiber reinforced clear and translucent panels, the glass fibers with the dried residue of the aqueous chemical treating composition of the present invention is ideally suited. The glass fibers when chopped have very good wet-out in the polymeric matrix within the limitations of the high speed operation for producing the panels. The glass fibers with the dried residue of the aqueous chemical treating composition can be supplied to such an operation as dry chopped glass fiber strand or as roving which is then chopped into the polymeric matrix which is traveling on a conveyor belt on a releasable substrate such as cellophane. The chopped glass fiber strands are dispersed somewhat uniformly over the polymeric matrix and the glass fibers settle and become wet-out in the polymeric matrix. The glass fiber containing polymeric matrix is then cured in a suitable oven to produce the glass fiber reinforced panels. The panels have good clarity with little fiber prominence. The treated glass fibers of the present invention can be used in translucent, unfilled panel systems and also in filled systems such as those having about 12 to around 50 weight percent calcium carbonate filled, pigmented filled and other filled and unfilled polymeric matrix systems.

In the preferred embodiment of the present invention, glass fibers are attenuated from molten batch and have a refractive index in the range of about 1.554 to 1.557 and have $B_2O_3$ concentration of around 5.2 percent by weight. The glass composition of the glass fibers is preferably in weight percent: $SiO_2$—55.8, CaO—21, $Al_2O_3$—14.8, $B_2O_3$—5.2, $Na_2O$—1.4 and $F_2$—0.5, along with trace amounts of materials usually present from batch compounds used to obtain the aforementioned components of the glass. The glass fibers are coated with the aqueous chemical treating composition during the formation of the glass fibers from a multitude of orifices in a bushing of a glass-melting furnace by a belt type binder applicator.

The aqueous chemical treating composition has a single aqueous emulsion having bisphenol polyester film forming polymer available from Savid under the trade designation Neoxil ® 954 as the sole polymeric material for film formation. The bisphenol polyester or esterified epoxy film forming polymer has a ratio of aliphatic unsaturation to aromatic unsaturation which is preferably less than 0.1 and which is most preferably around 0.07. The preferred silane coupling agent is the gamma methacryloxypropyltrimethoxy silane available from Union Carbide Corporation under the trade designation A174 silane, and the amount of the A174 silane is preferably in the range of about 2.7 to about 5 weight percent of the solids of the aqueous chemical treating composition. The water soluble cationic glass fiber lubricant is preferably the Emerylube ® 6717, which is present in an amount of about 1 to 2.5 weight percent of the solids of the aqueous chemical treating composition. The antistatic organic agent that is cationic quaternary ammonium salt with ethoxylation is the Neoxil ® AO-5620 antistat which is present as the sole antistat used in an effective amount of about 0.05 to about 0.15 weight percent of the aqueous treating composition. Also it is preferred to have present a strand hardening agent which is Resimene 841 melamine formaldehyde in an amount of around 0.1 to about 0.15 weight percent of the aqueous treating composition. The water which is present to make up the aqueous chemical treating composition is that amount to give a total solids preferably around 5 to 6 weight percent of the aqueous chemical treating composition. The amount of the bisphenol polyester resin is the remainder of the solids from the amounts of the coupling agent, lubricant, antistat and strand hardener. The pH of the aqueous chemical treating composition is preferably in the range of about 5.5 to about 6.2.

The aqueous chemical treating composition is prepared by hydrolyzing methacryloxypropyltrimethoxy silane with acetic acid in an amount of about 1 milliliter of acetic acid for about 20 grams of the silane in a premix tank. The hydrolyzation is performed by adding the acetic acid to about 10 to 20 weight percent of the water to be used in preparing the chemical treating composition and adding the silane to this mixture with stirring until complete hydrolyzation occurs. The cationic glass fiber lubricant is added to hot water 170° F. (76.7° C.) with stirring where the amount of water is about 1 percent of the total amount of water used in preparing the aqueous chemical treating composition in a premix tank. The aqueous emulsion of the bisphenol polyester as about 46 percent solids is combined with about twice its weight of water in a main mix tank. The hydrolyzed silane and glass fiber lubricant are added to the main mix tank. The cationic organic ethoxylated quaternary ammonium salt antistatic agent is combined with warm water in about a 1 to 16 ratio and added to the main mix tank. Any melamine formaldehyde resin is combined with water in a ratio of about 1 to 300 and added to the main mix tank. A small amount of antifoaming agent like SAG 10 can be added and the mix which has been agitated is diluted to the final desired volume with water. The final pH of the aqueous chemical treating composition is then adjusted to be in the range of about 5.5 to about 6.2 with a compatible organic acid such as acetic acid.

Preferably, the aqueous chemical treating composition is applied to green glass having a refractive index of about 1.555 during the formation of the glass fibers where the fibers have a diameter which can range from about $10.3 \times 10^{-5}$ to about $97.5 \times 10^{-5}$ or more inch and preferably is around 35 to $40 \times 10^{-5}$ inch. The aqueous chemical treating composition is applied to the glass fibers to give an add-on of the chemical treating composition in the range of about 0.5 to about 8 percent LOI (Loss on Ignition). The glass fibers are preferably G, H or K fibers gathered into strands to give constructions like G-67 (or H-55 or K-37) strand or the like. The strands of glass fibers are collected on a winder to produce a roving package and a plurality of the roving packages are dried in a Michigan oven at a temperature in the range of about 220° to 300° F. (104°–149° C.) for 11 hours. The roving can then be used in a process for producing clear or translucent acrylic polyester or epoxy panels by chopping the roving into chopped strand having a length of about 1/16 of an inch to 2 inches, preferably 1 inch. The chopped strands fall into the matrix resin which is present on a moving conveyor with a release substrate such as cellophane separating the matrix from the conveyor belt. The chopped glass fiber strand containing matrix resin is conveyed to an oven where the panels are heated to cure.

The invention and preferred embodiment are further illustrated by the following examples.

EXAMPLE 1

A 50 gallon (189.27 liter) aqueous chemical treating composition was prepared with the components of Table I. The composition was used to treat glass fibers as described in the preferred embodiment.

TABLE I

| Component | Wt. in grams | Wt. % Solids | Weight % of Aqueous Treating Composition |
|---|---|---|---|
| Gamma-methacryloxy-propyltrimethoxy silane | 380 | 2.7 | 0.16 |
| Acetic acid | 25 | — | 0.01 |
| Water for silane | 22720 | — | — |
| Cationic glass fiber lubricant (Emery ® 6717 lubricant) | 151.5 | 1.4 | 0.08 |
| Water for lubricant | 1895 | — | — |
| Aqueous emulsion of bisphenol A type polyester polymer (Neoxil ® 954 resin) | 22,720 | 93.2 | 5.5 |
| Organic quaternary ammonim antistat Neoxil ® AO-5620 | 284 | 2.5 | 0.15 |
| Water to result in a volume of 50 gallons | — | — | — |

The glass fibers had the glass composition of the preferred embodiment and had filament diameters of H or K and were constructed into glass fiber strands having a construction of H-55 or K-37 which were dried at the temperatures of the preferred embodiment. The dried strands were chopped into lengths of about 2.54 cm. These dried chopped glass fiber strands were added to an acrylic polyester matrix by the aforedescribed process to produce translucent panels.

EXAMPLE 2

A 50 gallon (189.27 liter) aqueous chemical treating composition having the formulation of Table II was applied in the manner of the preferred embodiment to the glass fibers having the glass composition of the preferred embodiment.

TABLE II

| Component | Wt. in grams | Wt. % Solids | Weight % of Aqueous Treating Composition |
|---|---|---|---|
| Gamma-methacryloxy-propyltrimethoxy silane | 380 | 2.7 | 0.16 |
| Acetic acid | 25 | — | 0.01 |
| Water for silane | 22720 | — | — |
| Cationic glass fiber lubricant (Emery ® 6717 lubricant) | 151.5 | 1.4 | 0.08 |
| Water for lubricant | 5,000 | — | — |
| Aqueous emulsion of bisphenol A type polyester polymer/in Dowanol (Neoxil ® 954 resin) | 22,720 | 94.1 | 5.5 |
| Organic quaternary ammonium antistat Neoxil ® AO-5620 | 284 | 2.6 | 0.15 |
| Resimene 841 resin melamine formaldehyde resin | 189 | 1.3 | 0.1 |
| Water to result in volume of 50 gallons | Dilute to volume | — | — |

The glass fibers had a filament diameter of H or K and were gathered into strands constructed as H-55 or K-37. The treated glass fiber strands were dried and were chopped into a length of around 2.54 centimeters. These chopped glass fiber strands were added to a polymeric matrix by the aforedescribed process to produce translucent panels.

For the above examples and Illustrative Example 2 of Table III, the aqueous chemical treating compositions were prepared in a manner similar to that of the preferred embodiment. The Illustrative Example 1 of Table III had an aqueous chemical treating composition prepared in a manner similar to that shown in U.S. Pat. No. 4,110,094. All of the glass fiber strands were formed and treated with the aqueous chemical treating composition in a similar manner to that of the preferred embodiment.

TABLE III

COMPONENTS OF AQUEOUS CHEMICAL TREATING COMPOSITION FOR ILLUSTRATIVE EXAMPLES

| Components of Illustrative Chemical Treating Composition 1/wt % wet/wt | Illustrative Example 1 gm per 75.5 1/wt % wet/wt % dry | Example 2 gm per 18.9 |
|---|---|---|
| Aqueous emulsifiable epoxy polymer (Epon 828 resin) | 2400/3.2/67.04 | —/—/— |
| Surfactant (Pluronic F-108 surfactant) | 260/0.3/7.3 | —/—/— |
| Polyvinyl pyrrolidone (K-30) | 720/0.95/20.1 | 180/0.95/21.7 |
| Gamma methacryloxy-propyltrimethoxy silane (A-174 silane) | 200/.26/3.4 | 50/0.16/3.6 |
| Acetic acid | 1 cc | — |
| Glass fiber lubricant (Emerylube ® 6717) | 80/0.1/2.2 | 20/0.1/2.4 |
| Aqueous bisphenolic polyester emulsion (Neoxil ® 952 polymer with 40 ± 2% solids) | —/—/— | 1500/3.17/72.3 |
| Water to achieve desired volume | | |

The glass fiber strand constructions were similar and the strands were chopped for addition to a polymeric matrix in a similar manner. The acrylic polyester panel reinforced with the dried chopped glass fiber strand of the illustrative examples and Examples 1-13 were prepared in a manner similar to that of the preferred embodiment. Illustrative Example 1 has the epoxy polymer and polyvinyl pyrrolidone without the non-tacky film forming polymer. Illustrative Example 2 of Table II has glass fibers having the dried residue of the aqueous chemical treating composition having only the bisphenolic polyester type of non-tacky film forming polymer without the presence of the epoxy polymer. Both Illustrative Examples 1 and 2 were devoid of the organic antistat and strand hardener.

Table IV presents further examples showing the performance charactersties of the chemically treated glass fiber strands in processing and in the reinforced polymeric panel. In addition to the strands of Examples 1 and 2, Examples 3-11 show characteristics for strands treated with aqueous chemical treatments like those of Examples 1 and 2. The chemical treatments of Examples 3-11 varied from those of Examples 1 and 2 by the indicated varying amounts of the cationic organic ethoxylated quaternary ammonium salt antistat and melamine formaldehyde strand hardener. Also shown in Table IV are glass fiber strands treated with aqueous chemical treatments of Illustrative Examples 1 and 2 as shown in Table III.

Table IV shows the improvement given by the glass fibers of the present invention compared to the glass fibers of the illustrative examples. The panels reinforced with the glass fibers of the present invention in Examples 1 and 2 have improved performance in the matchsticking and panel clarity characteristics over the same characterisitics of Illustrative Examples 1 and 2. Also the examples with amounts of the specific organic antistat and/or strand hardener outside the scope of the present invention gave inferior performance characteristics in matchsticking and choppability. The latter being gauged by chopper and cot cling.

In Table IV, results were obtained by visual observation and grading of the performance characteristics. The best results are those with none or slight ratings or excellent ratings with moderate ratings in not more than one characteristic along with slight or excellent ratings as being passable.

TABLE IV

| | Weight of Aqueous Treatment | | Process | | Panel Product | | |
|---|---|---|---|---|---|---|---|
| Strand Sample | Organic Antistat | Strand Hardener | Choppability Chopper & Cot Cling | Wet-thru | Strand Matchsticking | Clarity | Weatherability |
| Example 1 | 0.15 | 0 | SLIGHT | EXCELLENT | SLIGHT | EXCELLENT | EXCELLENT |
| Example 2 | 0.15 | 0.1 | VERY SLIGHT | EXCELLENT | NONE | EXCELLENT | EXCELLENT |
| Example 3 | 0 | 0 | MODERATE | EXCELLENT | NONE | EXCELLENT | EXCELLENT |
| Example 4 | 0 | 0.5 | MODERATE | EXCELLENT | NONE | EXCELLENT | EXCELLENT |
| Example 5 | 0.05 | 0 | MODERATE | EXCELLENT | NONE | EXCELLENT | EXCELLENT |
| Example 6 | 0 | 0.1 | MODERATE | EXCELLENT | SLIGHT | EXCELLENT | EXCELLENT |
| Example 7 | 0 | 0.2 | SLIGHT | EXCELLENT | SLIGHT | EXCELLENT | EXCELLENT |
| Example 8 | 0.25 | 0 | SLIGHT | EXCELLENT | SLIGHT | EXCELLENT | EXCELLENT |
| Example 9 | 0.40 | 0 | SLIGHT | EXCELLENT | HEAVY | EXCELLENT | EXCELLENT |
| Example 10 | 0.15 | 0.2 | SLIGHT | EXCELLENT | NONE | EXCELLENT | EXCELLENT |
| Example 11 | 0.25 | 0.2 | MODERATE | EXCELLENT | SLIGHT | EXCELLENT | EXCELLENT |
| Illustrative Example 1 | 0 | 0 | NONE | POOR | SLIGHT TO MODERATE | MODERATE | GOOD |
| Illustrative Example 2 | 0 | 0 | — | — | MODERATE TO HEAVY | — | — |

I claim:

1. Glass fiber strands having a plurality of glass fibers, where the glass fibers have at least a portion of their surfaces covered with the dried residue of an aqueous treating composition consisting essentially of:
   a. one or more bisphenol A polyesters where the film forming polymer is water soluble, dispersible or emulsifiable,
   b. organo coupling agent selected from the group consisting of acryloxy-containing, and methacryloxy-containing coupling agents, in an effective coupling agent amount,
   c. polyamino amide cationic fiber lubricant made with pelargonic acid where the lubricant is present in an amount in the range of about 0.05 to about 0.5 weight percent of the aqueous treating composition,
   d. an antistatic agent that is a cationic organic quaternary ammonium salt having alkoxy moieties and having an acid number of at least around 10 present in an amount of about 0.05 to about 0.4 weight percent of the aqueous treating composition,
   e. strand hardening agent in an amount from 0.1 to 0.5 weight percent, and
   f. water in an amount to give a total solids of the aqueous chemical treating composition in the range of about 1 to about 30 weight percent and wherein the aqueous chemical treating composition is essentially free of inorganic antistatic agents and where the pH of the aqueous treating composition is less than around 7.

2. Glass fiber strands of claim 1, wherein the glass has a refractive index in the range of 1.54 to 1.57.

3. Glass fiber strands of claim 1, wherein the bisphenol polyester resin is internally emulsified with ethoxylation.

4. Glass fiber strands of claim 1, wherein the bisphenol A polyester film forming polymer is that having the NMR curve of FIG. 2.

5. Glass fiber strands of claim 1, wherein the organo coupling agent is selected from the group consisting of acryloxyalkyl alkoxysilane and methacryloxyalkylalkoxysilane and hydrolysis products thereof.

6. Glass fiber strands of claim 1, wherein the organo coupling agent is gamma-methacryloxypropyl trimethoxy silane and hydrolysis products thereof having one or more methoxy groups hydrolyzed to hydroxyl groups where the organosilane coupling agent is present in an amount of about 0.1 to about 1 weight percent of the aqueous treating composition.

7. Glass fiber strands of claim 1, wherein the cationic organic alkoxylated quaternary ammonium salt antistatic agent has the infrared spectraphotometric curve of FIG. 3, and the NMR curve of FIG. 1 and has an acid number in the range of around 10 to around 20.

8. Glass fiber strands of claim 1, wherein the cationic organic alkoxylated quaternary ammonium salt antistatic agent has the formula:

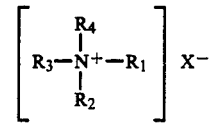

wherein one or more moieties of $R_1$, $R_2$, $R_3$ and $R_4$ can be the same or different alkoxy moieties with or without methylene groups and with a terminal alcoholic group represented by the formula:

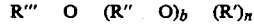

wherein $R'$ is a methylene group ($CH_2$) and n is an integer from 0 to 10; and wherein $R''$ is an ethylene group or propylene group or mixture thereof and b is an integer from 1 to 10; and wherein $R'''$ is hydrogen or a lower alkyl group having one to ten carbon atoms, and when less than four of the groups $R_1$, $R_2$, $R_3$ and $R_4$ are alkoxy groups, the remaining non-alkoxy groups $R_1$, $R_2$, $R_3$ and $R_4$ are alkyl groups having 1 to 30 carbon atoms, and $X_-$ is selected from the group consisting of: organic or inorganic anions including halides ion.

9. Glass fiber strands of claim 1, wherein the cationic organic alkoxylated quaternary ammonium salt antistatic agent has the formula:

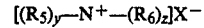

wherein:

$R_5$ is the same alkoxy moiety represented by the formula:

$$R'''\text{—}O\text{—}(R''\text{—}O)_b\text{—}(R')_n\text{—}$$

where R' is methylene (CH₂) and n is aan integer of 1 to 5, and where R'' is ethylene and b is an integer from 2 to 8, and where R''' is hydrogen or a methyl group, and wherein y is an integer of 3 or 4, and wherein when y=3 then Z=1 and when y=4 then Z=0, and wherein $R_6$ is a long chain alkyl having 6 to 25 carbon atoms, and wherein X⁻ is Cl⁻ or Br⁻.

10. Glass fiber strands of claim 9, wherein the amount of the organic antistat is in the range of about 0.05 to about 0.15 weight percent of the aqueous chemical treating composition.

11. Glass fiber strands of claim 1, wherein the strand hardening agent is melamine formaldehyde resin.

12. Glass fiber strands of claim 11, wherein the amount of the melamine formaldehyde resin hardening agent is at least 0.1 to 0.5 weight percent of the aqueous chemical treating composition.

13. Glass fibers of claim 1, wherein the glass fibers have a glass composition comprising:
silica dioxide, 55.8 to 55.9 weight percent; calcium oxide, 21 weight percent; aluminum oxide, 14.8 weight percent; boric oxide, 5.2 weight percent; sodium oxide, 1.4 weight percent; and fluorine 0.5 to 0.6 weight percent.

14. Glass fibers of claim 13, wherein the glass composition of the glass fibers further comprises 0.3 weight percent magnesium oxide.

15. Glass fiber strands having a plurality of glass fibers, consisting essentially of:
  a. glass fibers having a refractive index in the range of about 1.54 to about 1.57,
  b. dried reidue of an aqueous chemical treating composition present on at least a portion of the surfaces of the glass fibers, comprising:
    1. an aqueous emulsion or dispersion of a bisphenol A polyester film forming polymer having the NMR curve of FIG. 2 and having internal emulsifiication through ethoxylation and having a weight average molecular weight in the range of about 30,000 to 45,000 and having a polydispersity index of around 1.12 and a Mz/Mv of around 1.08 constituting the major portion of the slids of the aqueous chemical treating composition.
    2. organo coupling agent selected from the group consisting of acryloxy-containing and methacryloxy-containing coupling agents present in an amount in the range of about 0.1 to about 10 weight percent of the aqueous chemical treating composition,
    3. polyamino amide cationic lubricant which is a partiallyamidated polyalkylene amine prepared through condensation with fatty acids, where at least one of the fatty acids is pelargonic acid present in an amount in the range of about 0.05 to about 0.5 weight percent of the aqueous chemical treating composition,
    4. an antistatic agent that is cationic quaternary ammonium salt having alkoxy moieties and having an acid number of at least 10 and present in an amount in the range of about 0.05 to about 0.4 weight percent of the aqueous treating composition,
    5. strand hardening agent in an amount from 0.1 to 0.5 weight percent, and
    6. water in an amount to give a total solids of the aqueous chemical treating composition in the range of about 1 to about 20 weight percent, and wherein the aqueous chemical treating composition is essentially free of inorganic antistatic agents, and where the pH of the aqueous chemical treating composition is less than around 7.

16. Glass fibers of claim 15, wherein the dried residue of the aqueous chemical treating composition contains a strand hardening agent that is melamine formaldehyde resin present in an amount of at least around 0.1 to 0.5 weight percent of the aqueous chemical treating composition.

17. Glass fiber strands of claim 1, wherein the bisphenol A polyester is the sole film-forming polymer.

18. Glass fiber strands of claim 1, wherein the amount of the film forming polymer is in the range of about 1 to about 20 weight percent of the solids of the aqueous treating composition.

* * * * *

UNITED STATES PATENT AND TRADEMARK OFFICE
CERTIFICATE OF CORRECTION

PATENT NO. : 4,752,527

DATED : June 21, 1988

INVENTOR(S) : George V. Sanzero et al

It is certified that error appears in the above-identified patent and that said Letters Patent is hereby corrected as shown below:

In the title after "MATERIALS" insert --AND--.

Column 19, line 4, delete "aan" and insert --an--.

Column 19, line 37, delete "indexin" and insert --index in--.

Column 19, line 39, delete "reidue" and insert --residue--.

Column 19, line 45, delete "emulsifiication" and insert --emulsification--.

Column 20, line 3, delete "slids" and insert --solids--.

Column 20, line 12, delete "partiallyamidated" and insert --partially amidated--.

Signed and Sealed this

Twelfth Day of September, 1989

Attest:

DONALD J. QUIGG

*Attesting Officer*   Commissioner of Patents and Trademarks